Patented Apr. 27, 1948

2,440,542

UNITED STATES PATENT OFFICE 2,440,542

VOLATILE FLUORIDE RECOVERY

Everett C. Hughes, Cleveland Heights, Ohio, assignor to The Standard Oil Company, Cleveland, Ohio, a corporation of Ohio No Drawing. Application July 17, 1942, Serial No. 451,289

18 Claims. (Cl. 23—205)

After usage, such as in catalytic operations, volatile fluorides, as boron fluoride and hydrogen fluoride, are discharged from the point of usage in more or less dilution and admixture either with themselves or with hydrocarbon gases for instance, and while separation may be made by fractional distillation and condensation it is expensive and in many instances not profitable. In accordance with the present invention however, such fluorides may be recovered as desired, and with relatively little expense and with particular convenience.

To the accomplishment of the foregoing and related ends, the invention, then, comprises the features hereinafter fully described, and particularly pointed out in the claims, the following description setting forth in detail certain illustrative embodiments of the invention, these being indicative however, of but a few if the various ways in which the principle of the invention may be employed.

Boron fluoride, or hydrogen fluoride, are, in accordance with the invention, recovered from mixed gases by subjecting to absorption contact with dihydroxyfluoboric acid. This operation may be carried out at ordinary temperature, or lower, or absorption occurs also into a higher range of temperature. After the gas has been taken up by the absorber acid it may be easily disengaged, desorbed, or liberated by raising the temperature. Thus, a practical operating system for liberating the fluorides may involve raising the temperature to 120° C. or over, as for example 120–140° C. Absorption and desorption or liberation may be at atmospheric pressure or higher pressures. Loaded absorbent may be recycled to the original reactor and be stripped by the gases undergoing reaction. With convenience, the absorption or liberation may be carried out in counter current exposure, as for instance in a tower with suitable packing or surface provision, and the cool or absorbing zone being in the upper portion and the hot or liberating portion below.

As an example. A gas containing 3 mol per cent of $BF_3$ at 15 atmospheres pressure, the $BF_3$ having a partial pressure of 343 mm., was exposed in countercurrent flow to dihydroxyfluoboric acid, which proceeded to the hot liberation zone at 130° C. where the gas is disengaged. The gas was taken off from the top of the tower, and the acid was recycled to contact with fresh incoming gas.

Absorption of the boron fluoride occurs readily at 27° C. and lower, and also higher, as for instance around 55° C. Hydrocarbon gases present are not appreciably absorbed.

As another example: Gas containing hydrogen fluoride at 1 atmosphere was subjected to absorption with dihydroxyfluoboric acid at 35.2° C., and 91 per cent by weight of HF was absorbed. On raising the temperature of the acid to 100° C. 65 per cent of the absorbed HF came off, and by raising the temperature to 170° C. a total of 95.7 per cent by weight of the HF was recovered.

As another example: Gas containing 1 atmosphere pressure each of hydrogen fluoride and boron fluoride was subjected to absorption with dihydroxyfluoboric acid at room temperature (27° C.), and 93 weight per cent of HF and 140 weight per cent of $BF_3$ were absorbed to give a total of 233 weight per cent absorption. By heating the acid to 130° C., 73 weight per cent of the fluoride gases was recovered ready for re-use in a catalytic chamber. The acid was recycled to take up more gas.

When dihydroxyfluoboric acid has been used to absorb hydrogen fluoride or hydrogren fluoride and boron fluoride once and they are liberated from it at temperatures of 120–130° C., a change takes place in the denuded absorbent. It has a lower viscosity and a somewhat higher boiling point than dihydroxyfluoboric acid and is even more suitable as an absorbent, the slight change in chemical composition not diminishing its absorbing utility. Thus, it is desirable generally to prepare the absorbing liquid for regular operation.

Absorbent recovery of either boron fluoride or hydrogen fluoride or mixtures thereof is accordingly readily applicable in connection with catalytic operations, or in any other relation where it is desired to obtain such volatile fluoride in desired concentration.

Other modes of applying the principle of the invention may be employed, change being made as regards the details described, provided the features stated in any of the following claims, or the equivalent of such, be employed.

I therefore particularly point out and distinctly claim as my invention:

1. A process of recovering volatile inorganic fluorides, which comprises subjecting gas containing boron fluoride and hydrogen fluoride in an absorbing zone to contact in countercurrent flow with an absorbent, the primary absorbing component of which is a dihydroxyfluoboric acid to absorb at least part of both said boron fluoride and said hydrogen fluoride in the dihydroxyfluoboric acid, and finally removing at least part of the absorbed boron fluoride and hydrogen fluoride by heating to an elevated temperature in a liberating zone.

2. A process of recovering volatile inorganic fluorides, which comprises subjecting gas containing boron fluoride in an absorbing zone to contact in countercurrent flow with an absorbent, the primary absorbing component of which is a dihydroxyfluoboric acid to absorb at least part of said boron fluoride in the dihydroxyfluoboric acid, and finally removing at least part of the absorbed boron fluoride by heating to an elevated temperature in a liberating zone.

3. A process of recovering volatile inorganic fluorides, which comprises subjecting gas containing hydrogen fluoride in an absorbing zone to contact in countercurrent flow with an absorbent, the primary absorbing component of which is a dihydroxyfluoboric acid to absorb at least part of said hydrogen fluoride in the dihydroxyfluoboric acid, and finally removing at least part of the absorbed hydrogen fluoride by heating to an elevated temperature in a liberating zone.

4. A process of recovering volatile inorganic fluorides, which comprises subjecting gas containing boron fluoride and hydrogen fluoride to absorption contact with an absorbent, the primary absorbing component of which is a dihydroxyfluoboric acid to absorb at least part of both said hydrogen fluoride and said boron fluoride in the dihydroxyfluoboric acid, and then raising the temperature of said acid and absorbed fluorides to drive off at least part of the absorbed hydrogen fluoride and boron fluoride.

5. A process of recovering volatile inorganic fluorides, which comprises subjecting gas containing boron fluoride to absorption contact with an absorbent, the primary absorbing component of which is a dihydroxyfluoboric acid to absorb at least part of said boron fluoride in the dihydroxyfluoboric acid, and then raising the temperature of said acid and absorbed boron fluoride to drive off at least part of the absorbed boron fluoride.

6. A process of recovering volatile inorganic fluorides, which comprises subjecting gas containing hydrogen fluoride to absorption contact with an absorbent, the primary absorbing component of which is a dihydroxyfluoboric acid to absorb at least part of said hydrogen fluoride in the dihydroxyfluoboric acid, and then raising the temperature of said acid and absorbed hydrogen fluoride to drive off at least part of the absorbed hydrogen fluoride.

7. A process of recovering volatile inorganic fluorides, which comprises subjecting gas containing a volatile inorganic fluoride to absorption contact with an absorbent, the primary absorbing component of which is a dihydroxyfluoboric acid to absorb at least part of said inorganic fluoride in the dihydroxyfluoboric acid, and then raising the temperature of said acid and absorbed fluoride to drive off at least part of the absorbed inorganic fluoride.

8. A process of recovering volatile inorganic fluorides, which comprises subjecting gas containing hydrogen fluoride to absorption contact with an absorbent, the primary absorbing component of which is a dihydroxyfluoboric acid to absorb at least part of said hydrogen fluoride in the dihydroxyfluoboric acid, employing said dihydroxyfluoboric acid after contact with the hydrogen fluoride to absorb boron fluoride, and liberating the absorbed fluoride from said acid at a temperature higher than that maintained during the absorption of the boron fluoride.

9. A process of recovering volatile inorganic fluorides, which comprises subjecting gas containing hydrogen fluoride to absorption contact with an absorbent, the primary absorbing component of which is a dihydroxyfluoboric acid to absorb at least part of said hydrogen fluoride in the dihydroxyfluoboric acid, employing said dihydroxyfluoboric acid after contact with the hydrogen fluoride to absorb a volatile inorganic fluoride, and liberating the absorbed inorganic fluoride from said acid at a temperature higher than that maintained during the absorption of the inorganic fluoride.

10. A process of recovering volatile inorganic fluorides, which comprises subjecting gas containing hydrogen fluorides and boron fluoride to absorption contact with an absorbent, the primary absorbing component of which is a dihydroxyfluoboric acid to absorb at least part of both said hydrogen fluoride and said boron fluoride in the dihydroxyfluoboric acid, raising the temperature of said acid and absorbed fluorides to drive off at least part of the absorbed hydrogen fluoride and boron fluoride, and employing the denuded acid to absorb an additional amount of hydrogen fluoride and boron fluoride.

11. A process of recovering volatile inorganic fluorides, which comprises subjecting gas containing a volatile inorganic fluoride to absorption contact with an absorbent, the primary absorbing component of which is a dihydroxyfluoboric acid to absorb at least part of both said fluorides in the dihydroxyfluoboric acid, raising the temperature of said acid and absorbed fluoride to drive off at least part of the absorbed fluoride, and employing the denuded acid to absorb an additional amount of a volatile inorganic fluoride.

12. A process of recovering volatile inorganic fluorides, which comprises subjecting gas containing hydrogen fluoride to absorption contact with an absorbent, the primary absorbing component of which is a dihydroxyfluoboric acid to absorb at least part of said hydrogen fluoride in the dihydroxyfluoboric acid, raising the temperature of said acid and absorbed hydrogen fluoride to drive off at least part of the absorbed hydrogen fluoride, and employing the denuded acid to absorb an additional amount of hydrogen fluoride.

13. A process of recovering volatile inorganic fluorides, which comprises subjecting gas containing boron fluoride to absorption contact with an absorbent, the primary absorbing component of which is a dihydroxyfluoboric acid to absorb at least part of said boron fluoride in the dihydroxyfluoboric acid, raising the temperature of said acid and absorbed boron fluoride to drive off at least part of the absorbed boron fluoride, and employing the denuded acid to absorb an additional amount of boron fluoride.

14. In a continuous process of recovering hydrogen fluoride and boron fluoride contained in off-gas from a catalytic hydrocarbon operation, the steps which comprise contacting said gases in an absorbing zone with an absorbent, the primary absorbing component of which is a dihydroxyfluoboric acid maintained at a temperature to absorb at least part of both the hydrogen fluoride and the boron fluoride from said gas in the dihydroxyfluoboric acid, passing the dihydroxyfluoboric acid containing the absorbed fluorides to a fluoride liberating zone maintained at a temperature higher than the temperature of the absorbing zone whereby at least part of both the hydrogen fluoride and the boron fluoride is liberated and can be recovered and reused, and repeatedly returning the denuded dihydroxyfluoboric acid to the absorbing zone for further absorbing of the fluorides and then to the liberating zone.

15. In a continuous process of recovering hydrogen fluoride and boron fluoride contained in off-gas from a catalytic hydrocarbon operation, the steps which comprise contacting said gases in an absorbing zone with an absorbent, the primary absorbing component of which is a dihydroxyfluoboric acid maintained at a temperature to absorb at least part of both the hydrogen fluoride and the boron fluoride from said gas in the dihydroxyfluoboric acid, passing the dihydroxyfluoboric acid containing the absorbed fluorides to a fluoride liberating zone and heating it up to a temperature of at least 120° C. whereby at least part of both the hydrogen fluoride and the boron fluoride is liberated and can be recovered and reused, and whereby the acid is modified, and repeatedly returning the modified dihydroxyfluoboric acid to the absorbing zone for further absorbing of the fluorides and then to the liberating zone.

16. A process of recovering volatile inorganic fluorides, which comprises subjecting gas containing boron fluoride and hydrogen fluoride in an absorbing zone to contact in countercurrent flow with an absorbent, the primary absorbing component of which is the reaction product of dihydroxyfluoboric acid and hydrogen fluoride, to absorb at least part of both said boron fluoride and said hydrogen fluoride in the said absorbent, and finally removing at least part of the absorbed boron fluoride and hydrogen fluoride by heating to an elevated temperature in a liberating zone.

17. A process of recovering volatile inorganic fluorides, which comprises subjecting gas containing boron fluoride in an absorbing zone to contact in countercurrent flow with an absorbent, the primary absorbing component of which is the reaction product of dihydroxyfluoboric acid and hydrogen fluoride, to absorb at least part of said boron fluoride in the said absorbent, and finally removing at least part of the absorbed boron fluoride by heating to an elevated temperature in a liberating zone.

18. A process of recovering volatile inorganic fluorides, which comprises subjecting gas containing hydrogen fluoride in an absorbing zone to contact in countercurrent flow with an absorbent, the primary absorbing component of which is the reaction product of dihydroxyfluoboric acid and hydrogen fluoride, to absorb at least part of said hydrogen fluoride in the said absorbent, and finally removing at least part of the absorbed hydrogen fluoride by heating to an elevated temperature in a liberating zone.

EVERETT C. HUGHES.

REFERENCES CITED

The following references are of record in the file of this patent:

UNITED STATES PATENTS

| Number | Name | Date |
| --- | --- | --- |
| 2,109,340 | Nieuwland et al. | Feb. 22, 1938 |
| 2,148,115 | Gerhart et al. | Feb. 11, 1939 |
| 2,160,576 | Loder | May 30, 1939 |
| 2,167,358 | Gleason | July 25, 1939 |
| 2,196,363 | Robertson | Apr. 9, 1940 |
| 2,282,712 | Engs et al. | May 12, 1942 |
| 2,284,554 | Beyerstedt | May 26, 1942 |